(12) United States Patent
Bokov et al.

(10) Patent No.: US 10,652,581 B1
(45) Date of Patent: May 12, 2020

(54) ENTROPY CODING IN IMAGE AND VIDEO COMPRESSION USING MACHINE LEARNING

(71) Applicant: GOOGLE LLC, Mountain View, CA (US)

(72) Inventors: Alexander Bokov, Mountain View, CA (US); Hui Su, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/287,889

(22) Filed: Feb. 27, 2019

(51) Int. Cl.
| | |
|---|---|
| *H04N 19/70* | (2014.01) |
| *G06K 9/46* | (2006.01) |
| *H04N 19/61* | (2014.01) |
| *H04N 19/13* | (2014.01) |
| *H04N 19/14* | (2014.01) |
| *H04N 19/176* | (2014.01) |
| *G06T 9/00* | (2006.01) |
| *H04N 19/18* | (2014.01) |

(52) U.S. Cl.
CPC ........... *H04N 19/70* (2014.11); *G06K 9/4647* (2013.01); *G06T 9/002* (2013.01); *H04N 19/13* (2014.11); *H04N 19/14* (2014.11); *H04N 19/176* (2014.11); *H04N 19/18* (2014.11); *H04N 19/61* (2014.11)

(58) Field of Classification Search
CPC ........ H04N 19/70; H04N 19/13; H04N 19/14; H04N 19/176; H04N 19/18; H04N 19/61; G06K 9/4647; G06T 9/002
See application file for complete search history.

(56) References Cited

U.S. PATENT DOCUMENTS

| | | | |
|---|---|---|---|
| 2018/0205953 A1* | 7/2018 | George | .................... H03M 7/42 |
| 2019/0124348 A1* | 4/2019 | Yang | ....................... H04N 19/51 |

FOREIGN PATENT DOCUMENTS

EP 3562162 A1 10/2019

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.

(Continued)

*Primary Examiner* — Tsion B Owens
(74) *Attorney, Agent, or Firm* — Young Basile Hanlon & MacFarlane, P.C.

(57) ABSTRACT

Machine learning is used to refine a probability distribution for entropy coding video or image data. A probability distribution is determined for symbols associated with a video block (e.g., quantized transform coefficients, such as during encoding, or syntax elements from a bitstream, such as during decoding), and a set of features is extracted from video data associated with the video block and/or neighbor blocks. The probability distribution and the set of features are then processed using machine learning to produce a refined probability distribution. The video data associated with a video block are entropy coded according to the refined probability distribution. Using machine learning to refine the probability distribution for entropy coding minimizes the cross-entropy loss between the symbols to entropy code and the refined probability distribution.

13 Claims, 8 Drawing Sheets

(56) References Cited

OTHER PUBLICATIONS

Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion of International Application No. PCT/US2019/059035, dated Feb. 6, 2020; 14 pages.
Ma Changyue et al; "Convolutional Neural Network-Based Arithmetic Coding of DC Coefficients for HEVC Intra Coding"; 25th IEEE International Conference on Image Processing; Oct. 7, 2018; pp. 1772-1776.
Ott Jordan et al.; "A Deep Learning Approach to Identify Source Code in Images and Video"; IEEE/ACM 15th International Conference on Mining Software Repositories; May 27, 2018; pp. 376-386.

\* cited by examiner

ENTROPY CODING IN IMAGE AND VIDEO COMPRESSION USING MACHINE LEARNING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for encoding a video block to a bitstream according to an implementation of this disclosure includes determining a probability distribution for quantized transform coefficients of the video block. A set of features is extracted from video data associated with one or both of the video block or one or more neighbor blocks of the video block. The probability distribution and the set of features are processed using machine learning to produce a refined probability distribution. The quantized transform coefficients of the video block are entropy encoded according to the refined probability distribution to produce an encoded video block. The encoded video block is then output to the bitstream.

A method for decoding an encoded video block from a bitstream according to an implementation of this disclosure includes deriving syntax elements representative of the encoded video block from the bitstream. A probability distribution is determined for the syntax elements. A set of features is extracted from video data decoded from the bitstream. The probability distribution and the set of features are processed using machine learning to produce a refined probability distribution. The syntax elements are entropy decoded according to the refined probability distribution to produce quantized transform coefficients. The quantized transform coefficients are dequantized to produce transform coefficients. The transform coefficients are inverse transformed to produce a prediction residual. The prediction residual is reconstructed to produce a decoded video block. The decoded video block is then output to an output video stream.

An apparatus for encoding a video block to a bitstream includes a memory and a processor. The processor is configured to execute instructions stored in the memory. The instructions include instructions to determine a probability distribution for quantized transform coefficients of the video block, identify a set of features, process the probability distribution and the set of features using machine learning to produce a refined probability distribution, entropy encode the quantized transform coefficients of the video block according to the refined probability distribution to produce an encoded video block, and output the encoded video block to the bitstream. The set of features is identified based on one or more of video data associated with the video block, video data associated with one or more neighbor blocks of the video block, or coding modes used for encoding the one or more neighbor blocks.

An apparatus for decoding an encoded video block from a bitstream includes a memory and a processor. The processor is configured to execute instructions stored in the memory. The instructions include instructions to determine a probability distribution for syntax elements representative of the encoded video block in which the syntax elements derived from the bitstream, identify a set of features, process the probability distribution and the set of features using machine learning to produce a refined probability distribution, entropy decode the syntax elements according to the refined probability distribution to produce quantized transform coefficients, further decode the quantized transform coefficients to produce a decoded video block, and output the decoded video block to an output video stream. The set of features is identified based on one or more of video data associated with the encoded video block, video data associated with one or more neighbor blocks of the encoded video block, or coding modes used for decoding the one or more neighbor blocks.

An encoder according to an implementation of this disclosure performs operations for encoding a video block to a bitstream. The operations include using machine learning to refine a probability distribution for quantized transform coefficients of the video block based on a set of features extracted from one or both of the video block or one or more neighbor blocks of the video block. The quantized transform coefficients of the video block are encoded to produce an encoded video block in which encoding the quantized transform coefficients of the video block includes entropy encoding the quantized transform coefficients of the video block according to the refined probability distribution. The encoded video block is output to the bitstream.

A decoder according to an implementation of this disclosure performs operations for decoding an encoded video block from a bitstream. The operations include using machine learning to refine a probability distribution for syntax elements representative of the encoded video block based on a set of features extracted from video data decoded from the bitstream. The syntax elements are decoded to produce a decoded video block in which decoding the syntax elements includes entropy decoding the syntax elements according to the refined probability distribution. The decoded video block is output to an output video stream.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
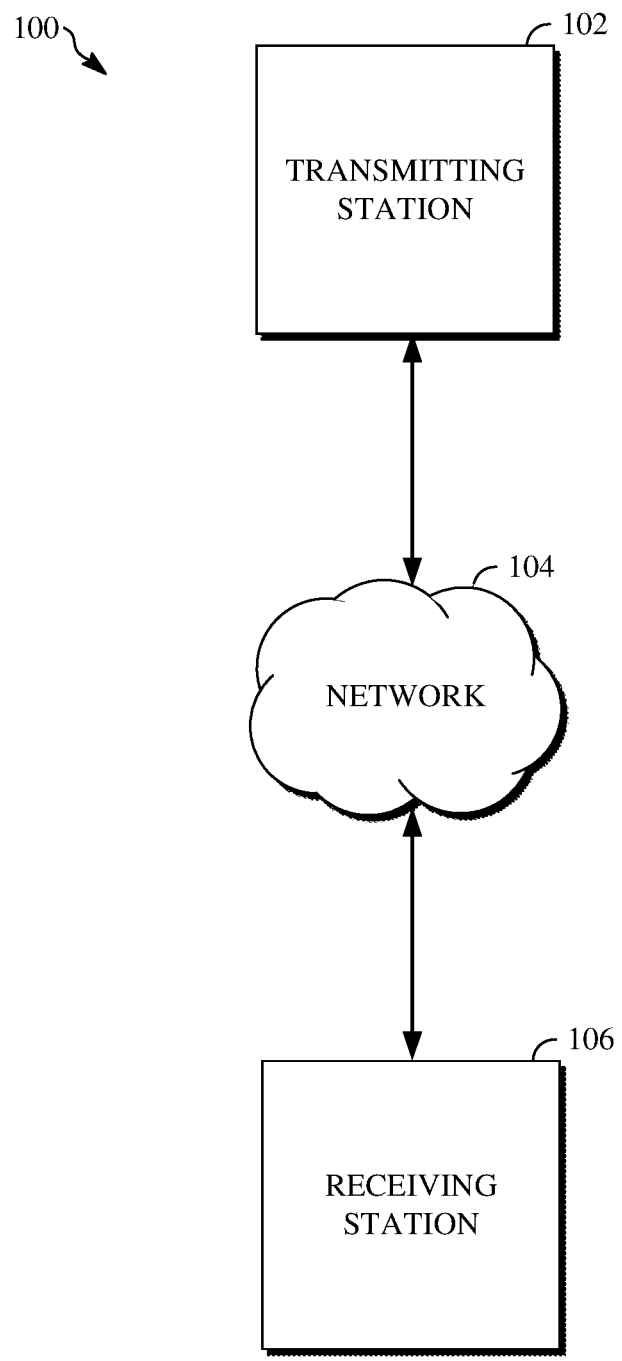
FIG. 1 is a schematic of an example of a video encoding and decoding system.

Video compression schemes may include breaking respective images, or frames, of an input video stream into smaller portions, such as blocks, and generating an output bitstream using techniques to limit the information included for respective blocks in the output. An encoded bitstream can be decoded to re-create the source images from the limited information. Typical video compression and decompression techniques use entropy coding to further reduce the number of bits required to encode video data to or decode video data from a bitstream. For example, entropy encoding may include using probability distributions of symbol values to encode to a bitstream, such as to reduce the amount of data that needs to be encoded. A decoder may then entropy decode the encoded symbols as syntax elements from the bitstream using those probability distributions.

The probability values of a probability distribution indicate the likelihood that a particular symbol of video data (e.g., a quantized transform coefficient of a transform block) will have a particular value (e.g., 0 or 1 for binary cases or other values for non-binary cases). The probabilities of the probability distribution may be stored in the form of a cumulative density function where the probability of a first symbol value is p0, the probability of first two symbol values is p0+p1, the probability of the first three symbol values is p0+p1+p2, and so on.

The probability values of a probability distribution may be updated during encoding or decoding, such as based on observations of the symbol values to encode or decode. The probability distributions are important to entropy coding because they are used to determine the number of bits required to code the symbols. For example, symbol values that are more probable may be coded using fewer bits, whereas values that are less probable may be coded using more bits. In this way, the total number of bits required to code video data can be minimized.

However, in some cases, it may be possible to refine a probability distribution using information related to the input video stream (e.g., during encoding) or bitstream (e.g., during decoding). That is, the probability distribution indicates the probabilities of the particular symbol values occurring within a symbol sequence or set to encode or decode, but without reference to other aspects of the input video stream or bitstream. For example, it may be possible to use other information from the encoding or decoding process, as applicable, to refine the probability distribution and, therefore, to improve the efficacy of entropy coding.

Implementations of this disclosure address problems such as these by using machine learning to refine probability distributions of symbol values of video data prior to entropy coding the symbol values. During encoding, a probability distribution is determined for quantized transform coefficients of a video block, and a set of features is extracted from video data associated with the video block and/or one or more neighbor blocks of the video block. The probability distribution and the set of features are then processed using machine learning to produce a refined probability distribution. The quantized transform coefficients of the video block are entropy encoded according to the refined probability distribution to produce an encoded video block. The encoded video block is then output to an output video stream.

During decoding, syntax elements representative of an encoded video block are derived from the bitstream. A probability distribution is determined for the syntax elements, and a set of features is extracted from video data decoded from the bitstream. The probability distribution and the set of features are then processed using machine learning to produce a refined probability distribution. The syntax elements are entropy decoded according to the refined probability distribution to produce quantized transform coefficients. The quantized transform coefficients are dequantized to produce transform coefficients. The transform coefficients are inverse transformed to produce a prediction residual. The prediction residual is reconstructed to produce a decoded video block. The decoded video block is then output to an output video stream.

Further details of techniques for entropy coding in image and video compression using machine learning are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
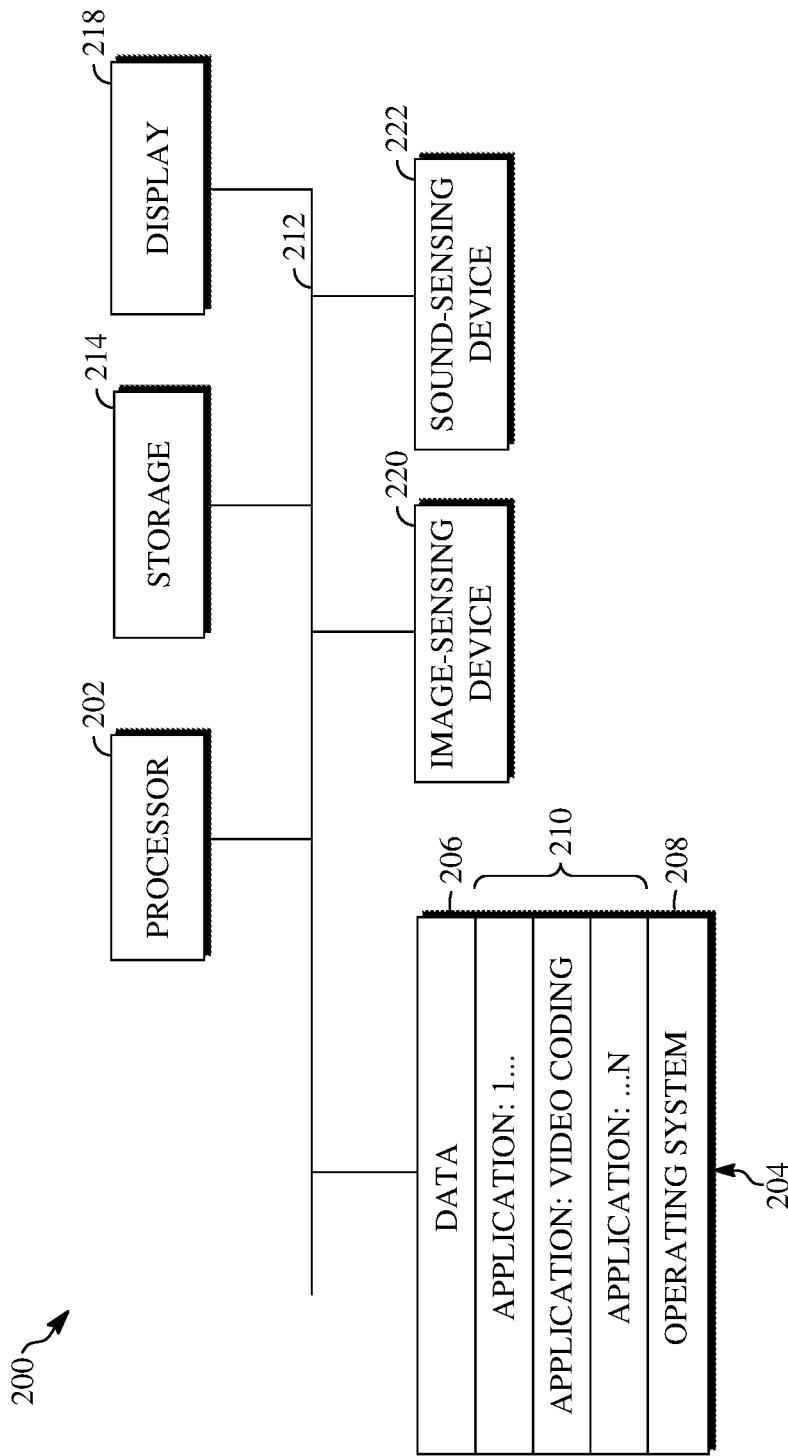
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video and/or image coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
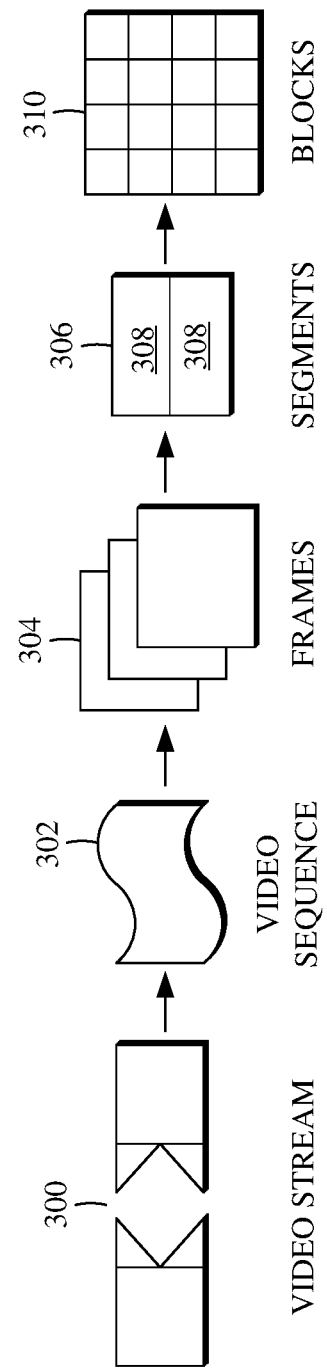
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
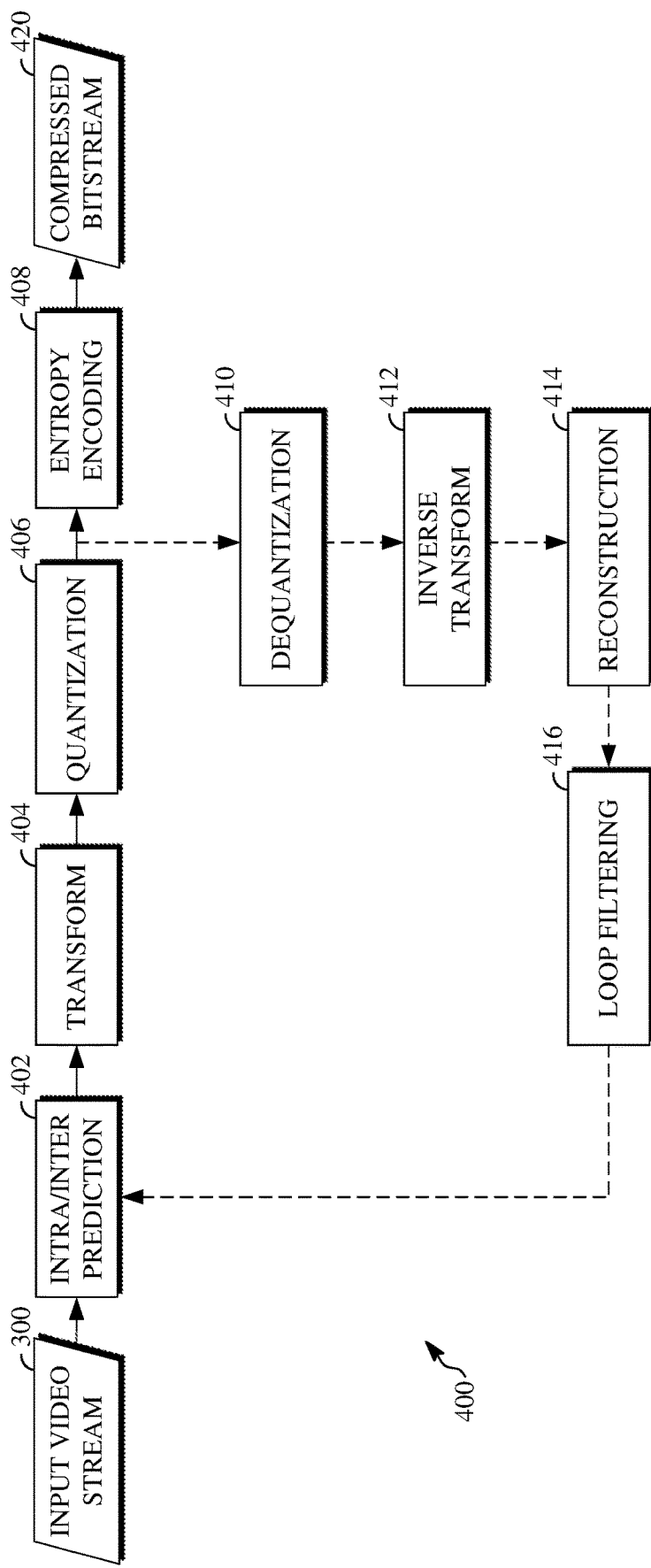
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters include, without limitation: a deblocking filter as in H.264, VP9, HEVC, and AV1; a Constrained Directional Enhancement Filter as in AV1; and a loop restoration filter as in AV1.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
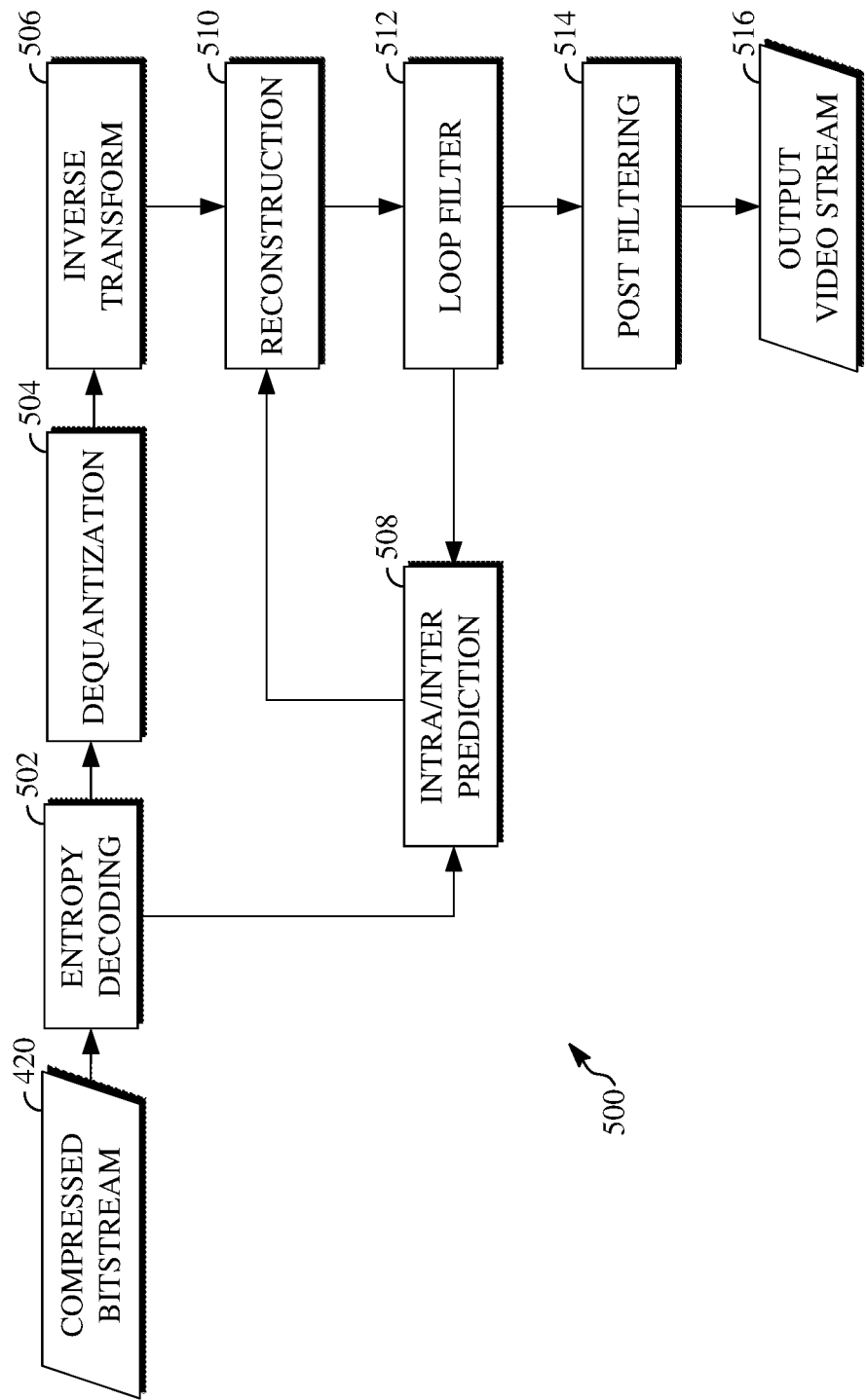
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514.

Figure 6:
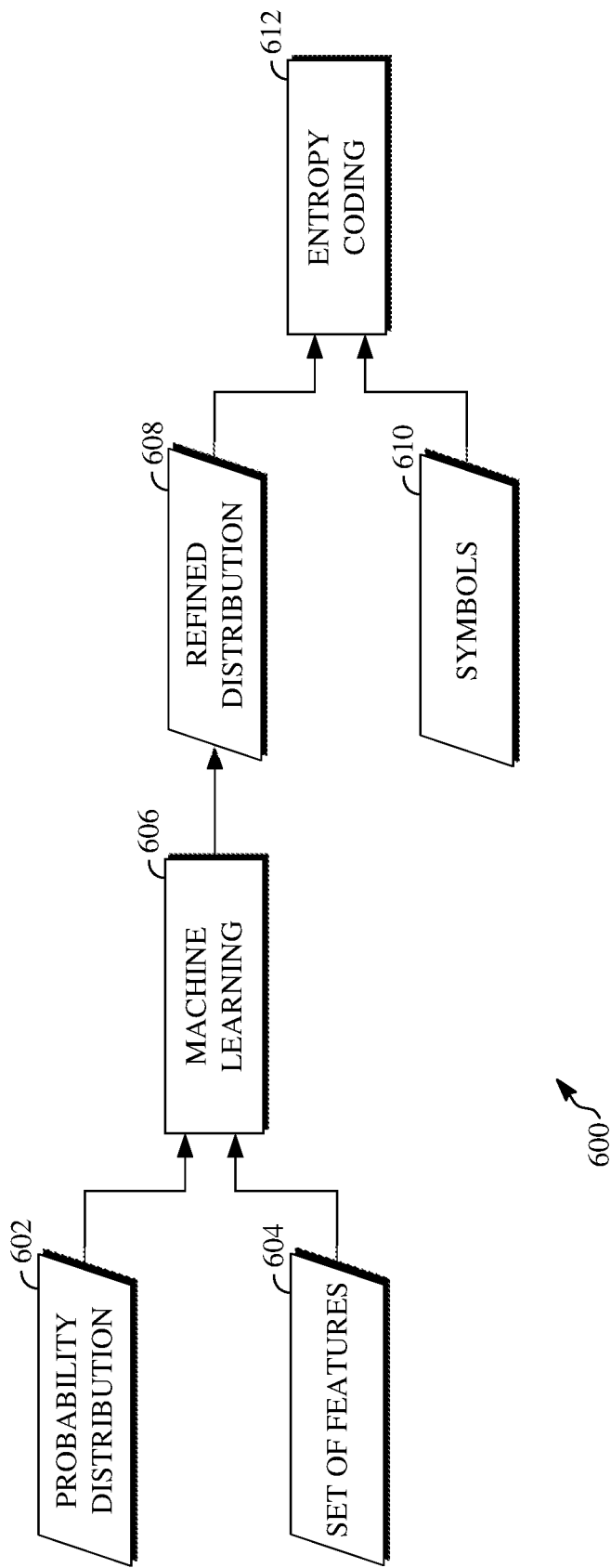
FIG. 6 is a block diagram of an example of an entropy coder that uses machine learning for encoding or decoding.

FIG. 6 is a block diagram of an example of an entropy coder 600 that uses machine learning for encoding or decoding. The entropy coder 600 represents functionality for entropy coding video data, such as to or from a bitstream (e.g., the bitstream 420 shown in FIGS. 4 and 5). For example, the entropy coder 600 can represent functionality for entropy encoding symbols to a bitstream, such as functionality performed at the entropy encoding stage 408 of the encoder 400 shown in FIG. 4. In another example, the entropy coder 600 can represent functionality for entropy decoding symbols from a bitstream, such as functionality performed at the entropy decoding stage 502 shown in FIG. 5.

Input received to the entropy coder 600 includes a probability distribution 602 and a set of features 604. The probability distribution 602 indicates probabilities for the possible values to be encoded to or to be decoded from a bitstream, as applicable. For example, where the values to be encoded or decoded represent binarized video data, the probability distribution 602 can include a first probability for the value 0 and a second probability for the value 1. In another example, where the values to be encoded or decoded represent non-binary video data, the probability distribution 602 can include N probabilities, where N is the number of different values which may be encoded or decoded.

The set of features 604 includes video information related to the video block to entropy code using the entropy coder 600 and/or one or more neighbor blocks of that video block. In particular, the set of features 604 is identified based on one or more of video data associated with the video block, video data associated with one or more neighbor blocks of the video block, or coding modes used for encoding the one or more neighbor blocks. The features of the set of features 604 may, for example, correspond to differences in pixel values of the video block along one or more different directions, edges or pixel attributes for the video block, intra-prediction modes used for encoding the one or more neighbor blocks of the video block, local image textures within the video block and/or the one or more neighbor blocks of the video block, other video data, or a combination thereof.

The machine learning stage 606 processes the probability distribution 602 and the set of features 604 using machine learning to produce a refined probability distribution 608. Processing the probability distribution 602 and the set of features 604 using machine learning includes applying a machine learning model to the probability distribution 602 and the set of features 604 using machine learning. The machine learning model used by the machine learning stage 606 may, for example, be or include a neural network, a deep neural network, a support vector machine, a cluster network, a Bayesian network, a genetic algorithm, or another model.

The refined probability distribution 608 is a distribution of probability values which have been updated based on the processing at the machine learning stage 606. The refined probability distribution 608 can be produced by updating some or all of the probabilities of the probability distribution 602. For example, the refined probability distribution 608 may include one or more probability values that is or are different from the respective probability value or values of the probability distribution 602.

The symbols 610 include one or more symbols, which may be commonly associated with a video aspect (e.g., a block of a video frame, a portion of a block, a segment or tile of a video frame, or another video aspect). The symbols 610 may represent binarized video data such that each symbol of the symbols 610 has a value of 0 or 1. Alternatively, the symbols 610 may represent non-binary video data such that each symbol of the symbols 610 may have a value of 0, 1, 2, or 3, or may have another value.

The machine learning model is trained according to previous probability distributions and previous video data to recognize and process the probability distribution 602 and the set of features 604. The machine learning stage 606 functions to use a machine learning model (e.g., a neural network) that is trained to minimize cross-entropy loss between the symbols 610 (e.g., quantized transform coefficients, syntax elements, or other symbols) and the refined probability distribution 608 produced by the machine learning stage 606.

An entropy coding stage 612 entropy codes the symbols 610 according to the refined probability distribution 608. Entropy coding the symbols 610 according to the refined probability distribution 608 can include arithmetic coding the symbols 610 using refined values of the refined probability distribution 608. The arithmetic coding can be used to code each of the symbols 610 based on the probability of those symbols 610 occurring in the video stream from which the symbols 610 are encoded or in the bitstream to which the symbols are decoded. For example, ones of the symbols 610 having higher probabilities can be arithmetic coded using smaller numbers of bits, whereas ones of the symbols 610 having lower probabilities can be arithmetic coded using larger numbers of bits. In some cases, techniques other than arithmetic coding can be used by the entropy coding stage 612.

The arithmetic coding or other technique used by the entropy coding stage 612 to reduce the symbols 610 to one or more bits defines a compression throughput for the entropy coding stage 612 and, therefore, for the entropy coder 600. The compression throughput refers to the efficacy of the entropy coding stage 612 to minimize the number of bits used to represent the symbols 610, either to a bitstream or from a bitstream. Thus, a compression throughput resulting from entropy coding the symbols 610 (e.g., quantized transform coefficients, syntax elements, or other video data) according to the refined probability distribution 608 is greater than a compression throughput resulting from entropy coding the symbols according to the probability distribution 602.

In some implementations, the probability distribution 602 may be used to update values stored in a probability table accessed by the entropy coder 600. For example, a probability table that stores values used to determine the probability distribution 602 can be updated according to the probability distribution 602, rather than the refined probability distribution 608. Updating the probability table includes changing one or more values stored in the probability table according to the probability distribution 602 after the symbols 610 are entropy coded according to the refined probability distribution 608 at the entropy coding stage 612.

Figure 7:
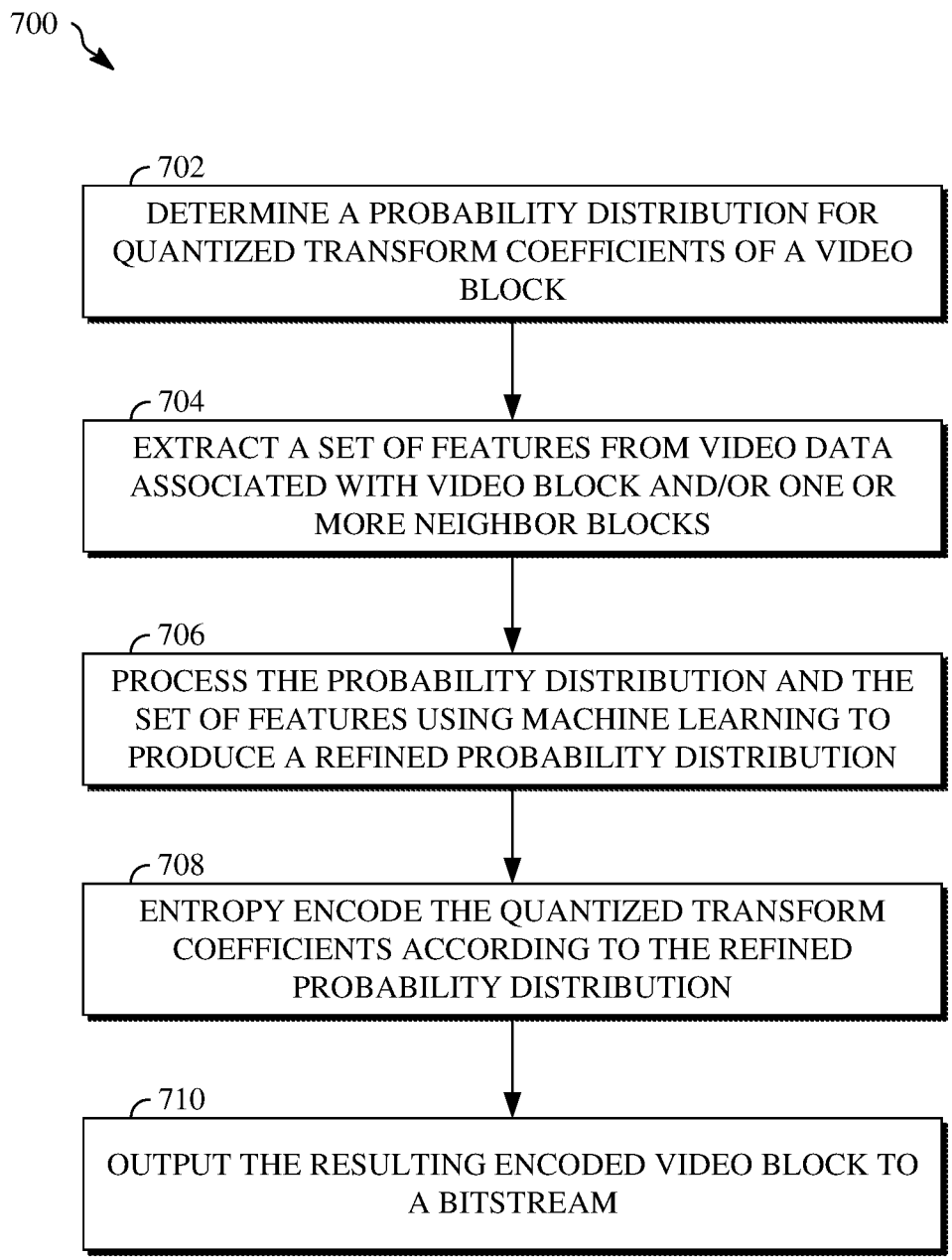
FIG. 7 is a flowchart diagram of an example of a technique for entropy encoding quantized transform coefficients of a video block to a bitstream using machine learning.
Figure 8:
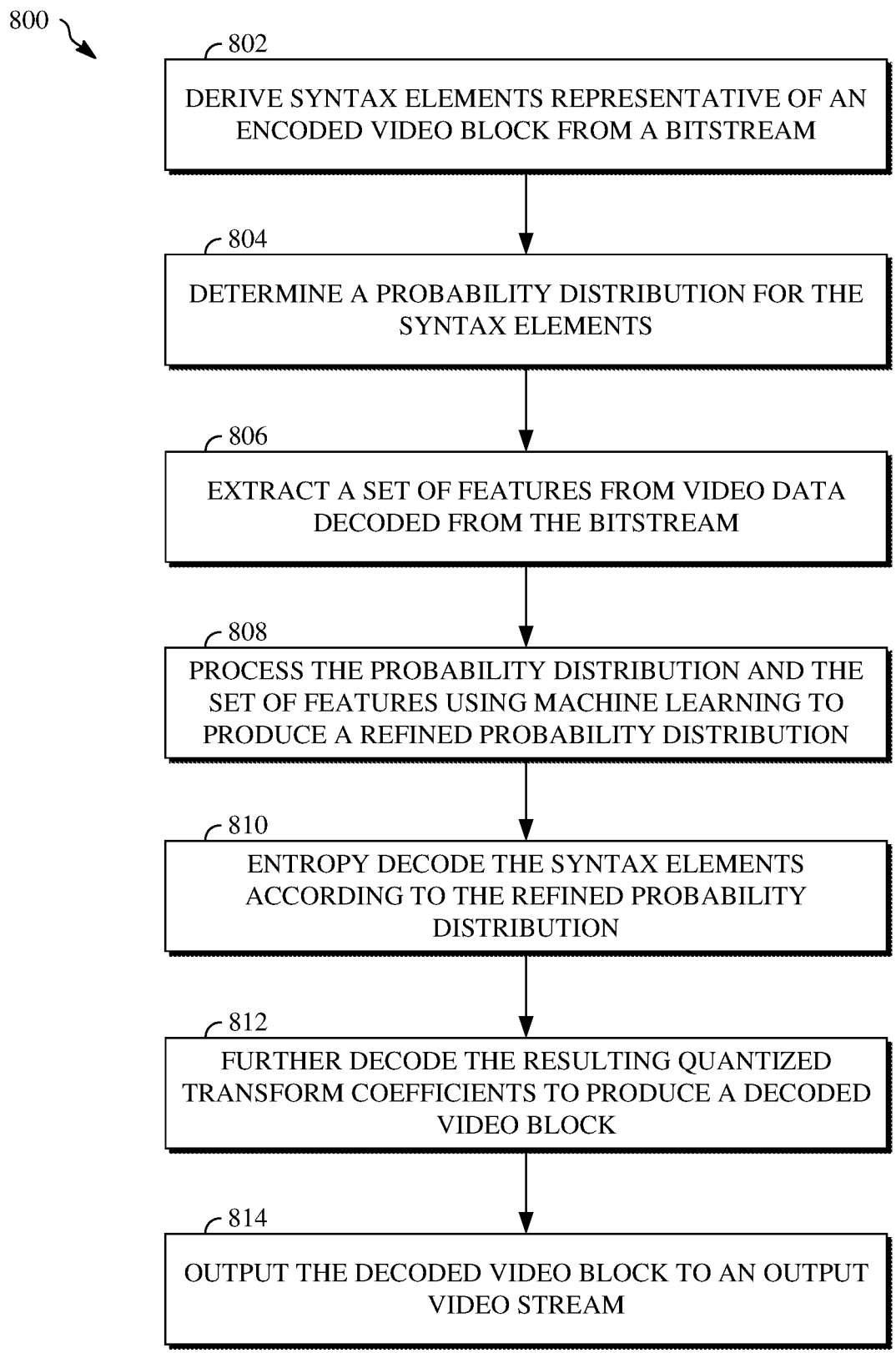
FIG. 8 is a flowchart diagram of an example of a technique for entropy decoding syntax elements representative of an encoded video block from a bitstream using machine learning.

Further details of techniques for entropy coding in image and video compression using machine learning are now described. FIG. 7 is a flowchart diagram of an example of a technique 700 for entropy encoding quantized transform coefficients of a video block to a bitstream using machine learning. FIG. 8 is a flowchart diagram of an example of a technique 800 for entropy decoding syntax elements representative of an encoded video block from a bitstream using machine learning.

The technique 700 and/or the technique 800 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 700 and/or the technique 800. The technique 700 and/or the technique 800 can be implemented using specialized hardware or firmware. For example, a hardware component configured to perform the technique 700 and/or the technique 800. As explained above, some computing devices may have multiple memories or processors, and the operations described in the technique 700 and/or the technique 800 can be distributed using multiple processors, memories, or both.

For simplicity of explanation, the technique 700 and technique 800 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for entropy encoding quantized transform coefficients of a video block to a bitstream using machine learning is shown. At 702, a probability distribution for the quantized transform coefficients is determined. The quantized transform coefficients are coefficients of the video block after the video block is processed at prediction, transform, and quantization stages of an encoder, for example, the intra/inter prediction stage 402, the transform stage 404, and the quantization stage 406 of the encoder 400 shown in FIG. 4. The probability distribution for the quantized transform coefficients is a distribution of the probabilities for each possible value of the quantized transform coefficients. The probability distribution can be stored in and retrieved from a probability table. The probability values of the probability distribution may be stored in the form of a cumulative density function.

At 704, a set of features is extracted from video data associated with one or both of the video block or one or more neighbor blocks of the video block. In particular, the set of features is identified based on one or more of video data associated with the video block, video data associated with one or more neighbor blocks of the video block, or coding modes used for encoding the one or more neighbor blocks. The features of the set of features may, for example, correspond to differences in pixel values of the video block along one or more different directions, edges or pixel attributes for the video block, intra-prediction modes used for encoding the one or more neighbor blocks of the video block, local image textures within the video block and/or the one or more neighbor blocks of the video block, other video data, or a combination thereof.

At 706, the probability distribution and the set of features are processed using machine learning to produce a refined probability distribution. Using the machine learning to produce the refined probability distribution includes feeding the probability distribution and the set of features into a machine learning model. The machine learning model is a machine learning aspect which has been trained according to previous probability distributions and previous video data to recognize and process the probability distribution and the set of features. In particular, the machine learning model is trained to process information identified, produced, selected, or otherwise determined using the probability distribution and the set of features.

The set of features extracted from the video data may, for example, correspond to differences in pixel values of the video block. For example, those pixel values may pertain to already reconstructed portions of the block context for the video block. A histogram of oriented gradients (e.g., a normalized histogram of oriented gradients) can be computed based on different directions of the differences in those pixel values. The machine learning model can be used to process the histogram of oriented gradients (i.e., the set of features may include a histogram of oriented gradients). In some implementations, the set of features includes a different type of feature descriptor instead of or in addition to the histogram of oriented gradients, for example, an edge orientation histogram, a scale-invariant feature transform descriptor, or a shape context.

The refined probability distribution can then be produced by updating the probability distribution based on the normalized histogram of oriented gradients. For example, the machine learning model trained using the previous probability distributions and previous video data can be trained to determine probabilities of different directions of the pixel differences based on the normalized histogram of oriented gradients. The machine learning model can then cause those probabilities to be used to update the probability distribution.

In some cases, such as where the probabilities of the different directions of the pixel differences do not meet a threshold (e.g., because those probabilities are too low), updating the probability distribution based on the normalized histogram of oriented gradients can include discarding the probabilities of the different directions of the pixel differences. In such a case, the refined probability distribution can be the probability distribution as originally received from the probability table.

In some implementations, the machine learning model can be used to process directions of intra-prediction modes used to encode one or more neighbor blocks of the video block. The set of features from the video data may, for example, correspond to different directions of those intra-prediction modes used for encoding the neighbor blocks. The machine learning model can process the different directions of the intra-prediction modes used for encoding the neighbor blocks to determine probabilities of prediction directions for the quantized transform coefficients of the video block. The refined probability distribution can then be produced by updating the probability distribution based on the probabilities of the prediction directions.

In some cases, such as where the probabilities of the prediction directions of the quantized transform coefficients do not meet a threshold (e.g., because those probabilities are too low), updating the probability distribution based on the probabilities of the prediction directions can include discarding the probabilities of the prediction directions. In such a case, the refined probability distribution can be the probability distribution as originally received from the probability table.

The foregoing represents ways in which the probability distribution and the set of features can be processed using machine learning to produce a refined probability model. A machine learning model can be used to process other video data, such as video data from the video block, video data from one or more neighbor blocks of the video block, video data from other aspects of the input video stream, or a combination thereof.

At 708, the quantized transform coefficients of the video block are entropy encoded according to the refined probability distribution. Entropy encoding the quantized transform coefficients according to the refined probability distribution includes using an entropy encoding technique, for example, arithmetic coding, to determine numbers of bits to use to encode the quantized transform coefficients based on the probabilities of the refined probability distribution, so as to minimize the number of bits required to signal the quantized transform coefficients within a bitstream. At 710, the encoded video block is output to the bitstream.

In some implementations, the technique 700 may include updating the probability distribution after entropy encoding the quantized transform coefficients. For example, a probability table that stores values used to determine the probability distribution can be updated according to the probability distribution, rather than the refined probability distribution. For example, the probability distribution can be used to update the values stored in the probability table on a symbol-by-symbol basis such that the probabilities of the probability distribution are updated after processing individual ones of the symbols. Updating the probability table includes changing one or more values stored in the probability table according to the probability distribution for the quantized transform coefficients.

Referring next to FIG. 8, the technique 800 for entropy decoding syntax elements representative of an encoded video block from a bitstream using machine learning is shown. At 802, the syntax elements are derived from the bitstream. Deriving the syntax elements can include decoding a portion of the bitstream corresponding to the encoded video block, a portion of the bitstream corresponding to an encoded video frame that includes the encoded video block, or another portion of the bitstream.

At 804, a probability distribution for the syntax elements is determined. Determining the probability distribution can include retrieving values from a probability table. For example, the probability table may be a table or other data store which stores values used to determine the probability distribution. The values may be probability values of a cumulative density function. The probability table may be a table accessible to a decoder used to entropy decode the syntax elements from the bitstream.

At 806, a set of features is extracted from video data decoded from the bitstream. The set of features can be features from the encoded video block and/or from one or more neighbor blocks of the encoded video block. As such, extracting the set of features can include identifying the set of features based on one or more of video data associated with the encoded video block, video data associated with one or more neighbor blocks of the encoded video block, or coding modes used for decoding the one or more neighbor blocks.

At 808, the probability distribution and the set of features are processed using machine learning to produce a refined probability distribution. Using the machine learning to produce the refined probability distribution includes feeding the probability distribution and the set of features into a machine learning model. The machine learning model is a machine learning aspect which has been trained according to previous probability distributions and previous video data to recognize and process the probability distribution and the set of features. In particular, the machine learning model is trained to process information identified, produced, selected, or otherwise determined using the probability distribution and the set of features.

For example, the machine learning model can be used to process a normalized histogram of oriented gradients. The set of features extracted from the video data may, for example, correspond to differences in pixel values of the encoded video block. For example, those pixel values may pertain to already reconstructed portions of the block context for the encoded video block. The normalized histogram of oriented gradients can be computed based on different directions of the differences in those pixel values.

The refined probability distribution can then be produced by updating the probability distribution based on the normalized histogram of oriented gradients. For example, the machine learning model trained using the previous probability distributions and previous video data can be trained to determine probabilities of different directions of the pixel differences based on the normalized histogram of oriented gradients. The machine learning model can then cause those probabilities to be used to update the probability distribution.

In some cases, such as where the probabilities of the different directions of the pixel differences do not meet a threshold (e.g., because those probabilities are too low), updating the probability distribution based on the normalized histogram of oriented gradients can include discarding the probabilities of the different directions of the pixel differences. In such a case, the refined probability distribution can be the probability distribution as originally received from the probability table.

In some implementations, the machine learning model can be used to process directions of intra-prediction modes used to decode one or more neighbor blocks of the encoded video block. The set of features from the video data may, for example, correspond to different directions of those intra-prediction modes used for decoding the neighbor blocks. The machine learning model can process the different directions of the intra-prediction modes used for decoding the neighbor blocks to determine probabilities of prediction directions for the syntax elements of the encoded video block. The refined probability distribution can then be produced by updating the probability distribution based on the probabilities of the prediction directions.

In some cases, such as where the probabilities of the prediction directions of the syntax elements do not meet a threshold (e.g., because those probabilities are too low), updating the probability distribution based on the probabilities of the prediction directions can include discarding the probabilities of the prediction directions. In such a case, the refined probability distribution can be the probability distribution as originally received from the probability table.

The foregoing represents ways in which the probability distribution and the set of features can be processed using machine learning to produce a refined probability model. A machine learning model can be used to process other video data, such as video data from the encoded video block, video data from one or more neighbor blocks of the encoded video block, video data from other aspects of the bitstream, or a combination thereof.

At 810, the syntax elements representative of the encoded video block are entropy decoded according to the refined probability distribution. Entropy decoding the syntax elements according to the refined probability distribution includes using an entropy decoding technique, for example, arithmetic coding, to determine symbols that correspond to each of the syntax elements based on the probabilities of the refined probability distribution.

At 812, the quantized transform coefficients are further decoded to produce a decoded video block. Further decoding the quantized transform coefficients includes dequantizing the quantized transform coefficients to produce transform coefficients, inverse transforming the transform coefficients to produce a prediction residual, and reconstructing the prediction residual to produce the decoded video block. For example, the further decoding can be performed at the dequantization stage 504, the inverse transform stage 506, the intra/inter prediction stage 508, and the reconstruction stage 510 of the decoder 500 shown in FIG. 5. At 814, the decoded video block is output to an output video stream.

In some implementations, the technique 800 may include updating the probability distribution after entropy decoding the syntax elements. For example, a probability table that stores values used to determine the probability distribution can be updated according to the probability distribution, rather than the refined probability distribution. For example, the probability distribution can be used to update the values stored in the probability table on a symbol-by-symbol basis such that the probabilities of the probability distribution are updated after processing individual ones of the symbols. Updating the probability table includes changing one or more values stored in the probability table according to the probability distribution for the syntax elements.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding an encoded video block from a bitstream, the method comprising:
   deriving syntax elements representative of the encoded video block from the bitstream;
   determining a probability distribution for the syntax elements;
   identifying, based on one or both of the syntax elements or other video data associated with the encoded video block, differences in pixel values of the encoded video block along one or more different directions;
   computing a normalized histogram of oriented gradients based on the one or more different directions of the differences in pixel values;

producing a refined probability distribution by updating the probability distribution based on the normalized histogram of oriented gradients;

entropy decoding the syntax elements according to the refined probability distribution to produce quantized transform coefficients;

dequantizing the quantized transform coefficients to produce transform coefficients;

inverse transforming the transform coefficients to produce a prediction residual;

reconstructing the prediction residual to produce a decoded video block; and outputting the decoded video block to an output video stream.

2. The method of claim 1, wherein a compression throughput resulting from entropy decoding the syntax elements according to the refined probability distribution is greater than a compression throughput resulting from entropy decoding the syntax elements according to the probability distribution.

3. The method of claim 1, wherein identifying the differences in the pixel values of the encoded video block along the one or more different directions comprises:

extracting the other video data associated with the encoded video block from the bitstream.

4. The method of claim 1, wherein the probability distribution is determined based on values stored in a probability table, the method further comprising:

updating the values stored in the probability table according to the probability distribution for the syntax elements.

5. The method of claim 1, wherein one or both of computing the normalized histogram of oriented gradients or producing the refined probability distribution includes using machine learning, wherein the machine learning uses a neural network that is trained to minimize cross-entropy loss between the syntax elements and the refined probability distribution.

6. An apparatus for decoding an encoded video block from a bitstream, the apparatus comprising:

a memory; and a processor configured to execute instructions stored in the memory to:

determine a probability distribution for syntax elements representative of the encoded video block, the syntax elements derived from the bitstream;

identify, based on one or both of the syntax elements or other video data associated with the encoded video block, differences in pixel values of the encoded video block along one or more different directions;

process the probability distribution and the differences in pixel values using machine learning to produce a refined probability distribution, including by:

computing a normalized histogram of oriented gradients based on the one or more different directions of the differences in pixel values; and updating the probability distribution based on the normalized histogram of oriented gradients;

entropy decode the syntax elements according to the refined probability distribution to produce quantized transform coefficients;

further decode the quantized transform coefficients to produce a decoded video block; and output the decoded video block to an output video stream.

7. The apparatus of claim 6, wherein a compression throughput resulting from entropy decoding the syntax elements according to the refined probability distribution is greater than a compression throughput resulting from entropy decoding the syntax elements according to the probability distribution.

8. The apparatus of claim 6, wherein the instructions to identify the differences in the pixel values of the encoded video block along the one or more different directions include instructions to:

extract the other video data associated with the encoded video block from the bitstream.

9. The apparatus of claim 6, wherein the probability distribution is determined based on values stored in a probability table, wherein the instructions include instructions to:

updating the values stored in the probability table according to the probability distribution for the syntax elements.

10. The apparatus of claim 6, wherein the machine learning uses a neural network that is trained to minimize cross-entropy loss between the syntax elements and the refined probability distribution.

11. A decoder that performs operations for decoding an encoded video block from a bitstream, the operations comprising:

using machine learning to refine a probability distribution for syntax elements representative of the encoded video block based on differences in pixel values of the encoded video block along one or more different directions, including by:

computing a normalized histogram of oriented gradients based on the one or more different directions of the differences in pixel values; and producing a refined probability distribution by updating the probability distribution based on the normalized histogram of oriented gradients;

decoding the syntax elements to produce a decoded video block, wherein decoding the syntax elements includes entropy decoding the syntax elements according to the refined probability distribution; and outputting the decoded video block to an output video stream.

12. The decoder of claim 11, wherein a compression throughput resulting from entropy decoding the syntax elements according to the refined probability distribution is greater than a compression throughput resulting from entropy decoding the syntax elements according to the probability distribution.

13. The decoder of claim 11, wherein the probability distribution is determined based on values stored in a probability table, wherein the decoder performs operations for updating the values stored in the probability table after entropy decoding the syntax elements according to the refined probability distribution.

* * * * *